US012548412B2

(12) United States Patent
Fulton et al.

(10) Patent No.: US 12,548,412 B2
(45) **Date of Patent: *Feb. 10, 2026**

(54) SYSTEM AND METHOD FOR WAGERING ON MULTIPLE EVENTS FROM AN EVENT DATABASE

(71) Applicant: CASTLE HILL HOLDING LLC, Charlottesville, VA (US)

(72) Inventors: Dan Fulton, Lancaster, PA (US); Brandon Booker, Antioch, TN (US); Andrew Scheiner, Crozet, VA (US); Josh Larson, Zeeland, MI (US)

(73) Assignee: CASTLE ISLAND IP HOLDING LLC, Charlottesville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,396

(22) Filed: Apr. 18, 2023

(65) Prior Publication Data

US 2023/0252858 A1 Aug. 10, 2023

Related U.S. Application Data

(63) Continuation of application No. 17/550,714, filed on Dec. 14, 2021, now Pat. No. 11,710,383, which is a (Continued)

(51) Int. Cl.
*G07F 17/32* (2006.01)
*G07F 17/34* (2006.01)

(52) U.S. Cl.
CPC ...... *G07F 17/3288* (2013.01); *G07F 17/3209* (2013.01); *G07F 17/3211* (2013.01);

(Continued)

(58) Field of Classification Search
CPC ............ G07F 17/3209; G07F 17/3211; G07F 17/3213; G07F 17/323; G07F 17/3244;

(Continued)

(56) References Cited

U.S. PATENT DOCUMENTS 4,874,177 A 10/1989 Girardin
5,275,400 A 1/1994 Weingardt et al.

(Continued)

FOREIGN PATENT DOCUMENTS

AU 758508 B2 3/2003
AU 784601 B2 5/2006

(Continued)

*Primary Examiner* — Justin L Myhr
(74) *Attorney, Agent, or Firm* — Workman Nydegger

(57) ABSTRACT

An improved gaming machine comprising a display screen, a processor, and an input device. The gaming machine displays on the display screen a gaming interface presenting an entertaining display and a summary window comprising a limited view of variables related to participants in multiple events. The gaming machine may conduct wagering on past events for a player, conducting a wager including the processor accessing a database to automatically retrieve data about one or more events in the past and included multiple participants. The data may include both a final ranking of the participants in the events and listings of features of the participants in the events, which may be displayed in the summary window.

21 Claims, 8 Drawing Sheets

Related U.S. Application Data continuation of application No. 17/102,066, filed on Nov. 23, 2020, now Pat. No. 11,605,268.

(60) Provisional application No. 62/939,340, filed on Nov. 22, 2019, provisional application No. 62/939,357, filed on Nov. 22, 2019.

(52) U.S. Cl.
CPC ........ *G07F 17/3213* (2013.01); *G07F 17/323* (2013.01); *G07F 17/3244* (2013.01); *G07F 17/3276* (2013.01); *G07F 17/34* (2013.01)

(58) Field of Classification Search
CPC ... G07F 17/3276; G07F 17/3288; G07F 17/34
See application file for complete search history.

(56) References Cited

U.S. PATENT DOCUMENTS

| | | | | |
|---|---|---|---|---|
| 5,411,258 | A | 5/1995 | Wilson et al. | |
| 5,830,068 | A | 11/1998 | Brenner et al. | |
| 5,957,775 | A | 9/1999 | Cherry | |
| 5,997,400 | A | 12/1999 | Seelig et al. | |
| 6,120,376 | A | 9/2000 | Cherry | |
| 6,152,822 | A | 11/2000 | Herbert | |
| 6,166,736 | A | 12/2000 | Hugh | |
| 6,252,597 | B1 | 6/2001 | Lokuge | |
| 6,309,307 | B1 | 10/2001 | Krause et al. | |
| 6,358,150 | B1 | 3/2002 | Mir et al. | |
| 6,450,887 | B1 | 9/2002 | Mir et al. | |
| 6,544,121 | B2 | 4/2003 | Deweese et al. | |
| 6,554,709 | B1 | 4/2003 | Brenner et al. | |
| 6,786,824 | B2 | 9/2004 | Cannon | |
| 6,837,791 | B1 | 1/2005 | Mcnutt et al. | |
| 6,887,156 | B2 | 5/2005 | Deweese et al. | |
| 6,893,018 | B2 | 5/2005 | Inoue | |
| 7,027,463 | B2 | 4/2006 | Mathew et al. | |
| 7,264,546 | B2 | 9/2007 | Marshall et al. | |
| 7,379,886 | B1 | 5/2008 | Zaring et al. | |
| 7,454,380 | B2 | 11/2008 | Garahi et al. | |
| 7,628,695 | B2 | 12/2009 | Lee | |
| 7,645,191 | B1 | 1/2010 | McKeever | |
| 7,648,414 | B2 | 1/2010 | McNutt et al. | |
| 7,774,259 | B1 | 8/2010 | Satterfield et al. | |
| 7,775,880 | B2 | 8/2010 | Downes | |
| 7,892,092 | B2 | 2/2011 | Matthews et al. | |
| 7,950,990 | B2 | 5/2011 | Marshall et al. | |
| 7,996,296 | B2 | 8/2011 | Lange | |
| 8,029,352 | B2 | 10/2011 | Lind et al. | |
| 8,081,846 | B2 | 12/2011 | Ignatchenko et al. | |
| 8,083,584 | B2 | 12/2011 | Greiner et al. | |
| 8,118,675 | B2 | 2/2012 | Horowitz et al. | |
| 8,221,225 | B2 | 7/2012 | Laut | |
| 8,241,110 | B2 | 8/2012 | Katz et al. | |
| 8,277,296 | B2 | 10/2012 | Okada | |
| 8,292,729 | B2 | 10/2012 | Vlazny et al. | |
| 8,342,959 | B2 | 1/2013 | Mahaffey et al. | |
| 8,360,835 | B2 | 1/2013 | Strause et al. | |
| 8,370,249 | B2 | 2/2013 | Lange et al. | |
| 8,419,544 | B2 | 4/2013 | Mcnutt et al. | |
| 8,532,798 | B2 | 9/2013 | Ferraro, III et al. | |
| 8,597,109 | B2 | 12/2013 | Herrmann et al. | |
| 8,636,571 | B2 | 1/2014 | Miller | |
| 8,684,847 | B2 | 4/2014 | Grundstedt et al. | |
| 8,721,440 | B2 | 5/2014 | Ward et al. | |
| 8,777,735 | B1 | 7/2014 | Fine et al. | |
| 8,814,668 | B1 * | 8/2014 | Cornett | G07F 17/3244 463/28 |
| 8,905,832 | B2 | 12/2014 | Miller | |
| 8,968,089 | B2 | 3/2015 | Miodunski | |
| 9,047,737 | B2 | 6/2015 | Brooks et al. | |
| 9,053,608 | B2 | 6/2015 | Brooks et al. | |
| 9,064,369 | B2 | 6/2015 | Schueller et al. | |
| 9,153,101 | B2 | 10/2015 | Cannon et al. | |
| 9,218,721 | B2 | 12/2015 | Herbert | |
| 9,251,547 | B2 | 2/2016 | Fontaine et al. | |
| 9,355,102 | B2 | 5/2016 | Thukral et al. | |
| 9,437,078 | B2 | 9/2016 | Keech | |
| 9,443,392 | B2 | 9/2016 | Keech | |
| 9,633,518 | B2 | 4/2017 | Herbert et al. | |
| 9,633,519 | B2 | 4/2017 | Zimmerl et al. | |
| 9,652,926 | B2 | 5/2017 | Gelman et al. | |
| 9,717,983 | B1 * | 8/2017 | Pollowitz | G07F 17/3288 |
| 9,747,748 | B2 | 8/2017 | Corckran et al. | |
| 9,965,752 | B2 | 5/2018 | Schrotter et al. | |
| 10,229,556 | B2 | 3/2019 | Weber et al. | |
| 10,269,215 | B2 | 4/2019 | Prabhu | |
| 10,395,471 | B2 | 8/2019 | Lind et al. | |
| 10,553,077 | B2 | 2/2020 | Miller | |
| 10,818,126 | B2 | 10/2020 | Gelman et al. | |
| 10,909,796 | B2 | 2/2021 | Miller et al. | |
| 10,997,825 | B2 | 5/2021 | Neely et al. | |
| 11,004,310 | B2 | 5/2021 | Mckeever et al. | |
| 11,055,967 | B2 | 7/2021 | Miller et al. | |
| 11,069,184 | B2 | 7/2021 | Lind et al. | |
| 11,074,787 | B1 | 7/2021 | Huke et al. | |
| 11,100,753 | B1 | 8/2021 | Huke et al. | |
| 11,189,133 | B2 | 11/2021 | Neely et al. | |
| 11,189,134 | B2 | 11/2021 | Neely et al. | |
| 2001/0016509 | A1 | 8/2001 | Kusuda | |
| 2001/0039209 | A1 | 11/2001 | Deweese et al. | |
| 2002/0187836 | A1 | 12/2002 | Meyer | |
| 2003/0190953 | A1 | 10/2003 | Deweese et al. | |
| 2004/0229671 | A1 | 11/2004 | Stronach et al. | |
| 2005/0063365 | A1 | 3/2005 | Mathew et al. | |
| 2005/0101385 | A1 | 5/2005 | Kido | |
| 2005/0125685 | A1 | 6/2005 | Samuelsson et al. | |
| 2005/0170886 | A1 | 8/2005 | Miller | |
| 2005/0176496 | A1 | 8/2005 | Stronach | |
| 2005/0203651 | A1 * | 9/2005 | Vincenzini | G07C 1/24 700/91 |
| 2006/0035712 | A1 | 2/2006 | Eastman et al. | |
| 2006/0246990 | A1 | 11/2006 | Downes | |
| 2006/0279834 | A1 | 12/2006 | Eiselt | |
| 2007/0197281 | A1 | 8/2007 | Stronach | |
| 2007/0225069 | A1 | 9/2007 | Garahi et al. | |
| 2008/0214290 | A1 | 9/2008 | Lee | |
| 2008/0227532 | A1 | 9/2008 | Gelman et al. | |
| 2008/0234051 | A1 | 9/2008 | McNutt et al. | |
| 2008/0248846 | A1 | 10/2008 | Stronach et al. | |
| 2009/0069077 | A1 * | 3/2009 | Saito | G07F 17/3288 463/25 |
| 2010/0144428 | A1 | 6/2010 | Fontaine et al. | |
| 2010/0331066 | A1 | 12/2010 | Jung et al. | |
| 2011/0117981 | A1 * | 5/2011 | Baerlocher | G07F 17/3267 463/16 |
| 2011/0250938 | A1 | 10/2011 | Bassignana et al. | |
| 2012/0028703 | A1 | 2/2012 | Anderson et al. | |
| 2013/0007648 | A1 | 1/2013 | Gamon et al. | |
| 2013/0053991 | A1 * | 2/2013 | Ferraro, III | G06Q 90/00 700/93 |
| 2014/0066189 | A1 | 3/2014 | Brooks et al. | |
| 2014/0274343 | A1 | 9/2014 | Herbert | |
| 2014/0274390 | A1 | 9/2014 | Kasten | |
| 2014/0315609 | A1 | 10/2014 | Miller et al. | |
| 2015/0018085 | A1 | 1/2015 | Herbert | |
| 2015/0228163 | A1 | 8/2015 | Clarebrough et al. | |
| 2015/0262452 | A1 * | 9/2015 | Corckran | G07F 17/3295 463/28 |
| 2015/0287278 | A1 * | 10/2015 | Shore | G07F 17/3248 463/29 |
| 2015/0364009 | A1 * | 12/2015 | Keech | G07F 17/3225 463/28 |
| 2016/0189483 | A1 | 6/2016 | Ballman | |
| 2016/0273758 | A1 | 9/2016 | Fujimura | |
| 2017/0208249 | A1 | 7/2017 | Choi et al. | |
| 2017/0372561 | A1 * | 12/2017 | Aronson | G07F 17/3246 |
| 2018/0154266 | A1 | 6/2018 | Greiner, Jr. et al. | |
| 2019/0035223 | A1 | 1/2019 | Parthimos | |
| 2019/0051099 | A1 | 2/2019 | Pawloski et al. | |
| 2019/0122502 | A1 | 4/2019 | Aronson et al. | |
| 2019/0251789 | A1 * | 8/2019 | Waters | G07F 17/3213 |
| 2019/0325707 | A1 | 10/2019 | Aronson et al. | |

(56) References Cited

U.S. PATENT DOCUMENTS

| | | | | |
|---|---|---|---|---|
| 2019/0340879 | A1* | 11/2019 | Williams | G07F 17/3225 |
| 2020/0027307 | A1 | 1/2020 | Lind et al. | |
| 2020/0175820 | A1 | 6/2020 | Miller et al. | |
| 2020/0286333 | A1 | 9/2020 | Waters | |
| 2021/0027569 | A1 | 1/2021 | Gelman et al. | |
| 2021/0217280 | A1 | 7/2021 | Lutnick et al. | |
| 2021/0241582 | A1 | 8/2021 | Neely et al. | |
| 2021/0256650 | A1 | 8/2021 | Huke et al. | |
| 2021/0286594 | A1 | 9/2021 | Lee et al. | |
| 2021/0287485 | A1 | 9/2021 | Asher et al. | |
| 2021/0287494 | A1 | 9/2021 | Amaitis et al. | |

FOREIGN PATENT DOCUMENTS

| | | | |
|---|---|---|---|
| AU | 2001233162 | B2 | 9/2006 |
| AU | 785176 | B2 | 10/2006 |
| AU | 2021215205 | A1 | 9/2021 |
| CA | 3107715 | A1 | 8/2021 |
| CN | 102883785 | A | 1/2013 |
| EP | 1076321 | A1 | 2/2001 |
| EP | 3859698 | A1 | 8/2021 |
| GB | 2591402 | A | 7/2021 |
| HK | 1220028 | A1 | 4/2017 |
| JP | 6903805 | B1 | 7/2021 |
| JP | 2021101355 | A | 7/2021 |
| JP | 6923835 | B1 | 8/2021 |
| JP | 2021117643 | A | 8/2021 |
| JP | 2021119540 | A | 8/2021 |
| KR | 20020088709 | A | 11/2002 |
| KR | 20050074224 | A | 7/2005 |
| KR | 20080083955 | A | 9/2008 |
| KR | 101335418 | B1 | 12/2013 |
| KR | 101406340 | B1 | 6/2014 |
| WO | 0025876 | A1 | 5/2000 |
| WO | 0165507 | A2 | 9/2001 |
| WO | 0177964 | A2 | 10/2001 |
| WO | 0191872 | A1 | 12/2001 |
| WO | 0167352 | A8 | 2/2002 |
| WO | 0164305 | A8 | 3/2003 |
| WO | 2008024705 | A2 | 2/2008 |
| WO | 2014159971 | A1 | 10/2014 |
| WO | 2015076682 | A1 | 5/2015 |

* cited by examiner

SYSTEM AND METHOD FOR WAGERING ON MULTIPLE EVENTS FROM AN EVENT DATABASE

CROSS-REFERENCE TO RELATED APPLICATIONS

This application is a continuation of U.S. application Ser. No. 17/550,714, filed Dec. 14, 2021, now U.S. Pat. No. 11,710,383, which is a continuation of U.S. application Ser. No. 17/102,066, filed Nov. 23, 2020, now U.S. Pat. No. 11,605,268, which claims the benefit of U.S. provisional application nos. 62/939,357 filed Nov. 22, 2019, and 62/939,340 filed Nov. 22, 2019. The noted priority applications are incorporated herein by reference in their entirety.

FIELD OF THE DISCLOSURE

The field of the disclosure generally relates to gaming consoles, gaming machines, or networked gaming machines, such as gaming machines found in casinos or betting environments, and related methods of operation. The gaming devices include systems that enable pari-mutuel wagering on past events, such as gaming consoles, mobile devices, personal computers, gaming machines or networked gaming machines, and related methods for conducting pari-mutuel wagering.

BACKGROUND

Within the gambling or gaming industry, including sports betting, esports betting, games of chance, etc., traditional gaming machines include slot machines, poker machines, video lottery terminals, gaming consoles, and similar devices. These traditional gaming machines are configured to provide an interface for wagering on game events and have proven popularity. However, players quickly become tired of various adaptations of existing gaming machines, requiring the development of new and inventive ways to represent or play games on such gaming machines. For this reason, game creators must continually invent new and innovative ways to represent games and game play to stimulate players and encourage further interest.

Many traditional gaming machines rely on displaying a game of chance, for example, games based on randomized events and/or fixed odds. These gaming machines employ lights, video displays, creative animations, and sounds to engage a player's interest and may allow a player the opportunity to play independently of others at their own selected pace, placing wagers up to every few seconds. The display and individualized control of gameplay accommodate players that seek a game that provides more immediate and sustained rewards than traditional games of skill or strategy.

Many players prefer games where they can influence the outcome at least to some degree based on mental skill, for example, using experience from the study of the game and/or mathematical analysis to place a more informed, or handicapped, wager. These traditional games of skill often involve multiple players and require increased information, coordination and time to successfully conduct, but have proven popular throughout history and are generally more widely permitted by regulators than pure games of chance.

Horse racing is a particularly popular and long-enduring basis for gaming that has won more widespread acceptance, such that it is subject to less regulation than games of pure chance. Horse racing is recognized as a game of skill where experienced players can analyze information on the race participants before placing informed or handicapped wagers, and the racing itself provides an entertaining presentation for the players. Gaming associated with horse racing can differ from fixed-odds betting and may benefit from the advantages of pari-mutuel betting, where a player's wager is divided into several betting pools for different winning possibilities, such as picking the winner of a race, picking the top three finishers in exact order, or any of three selections finishing first and second, with the money in different pools accumulating until it is won.

The strategic elements associated with horse racing allow players to feel more like a participant in a larger event and increase both a player's interest and excitement.

To facilitate their analysis of the race, a player requires access to a variety of data, such as historical data relating to a particular horse and to how the horse has performed in different distances, different environmental conditions, and other racing conditions, as well as data on the jockey and trainer associated with the horse. This information is generally provided to players at a racetrack in a daily racing form or horse-racing form. Players also require information on the betting pools and the payouts involved.

Although drawn to the strategic elements of the game, casual players are often intimidated by the amount of information presented and its format. These players can become frustrated when interpreting the information to have a coherent and enjoyable gaming strategy. New players are also limited by access to horse races due to the limited racing schedules and facilities required by such events.

Efforts have been made to represent traditional games of skill or skills-based gaming formats in gaming machines to combine the most appealing features of each. These gaming machines often bodily incorporate a traditional multi-participant game, such as poker, into a video display that can allow a player the opportunity to place wagers that can be won or lost in a short period relative to the traditional game, possibly without the need for additional players, attendants, and the related delays in the enjoyment of the game that other participants may cause. Similarly, the implementation of these traditional and/or multi-participant games of skill in gaming machines can increase the availability of the gaming machines due to the less restrictive regulations of these types of games relative to pure games of chance.

Unfortunately, existing efforts to develop a gaming machine or system capable of combining the advantages of traditional gaming machines and traditional games of skill have had only limited success.

Historical horse racing (HHR), or instant racing, has been a particularly attractive area for representing a traditional game of skill in gaming machines. HHR is based on a method of gaming that allows players to wager on the historical results of races or other events that have already occurred. In practice, HHR involves the random selection of a race from a database and the presentation of information related to the participants to the player without any information identifying the race, such as horse or track names. The player can then make a wager on their predicted result and is subsequently provided with a replay or animated re-enactment of the race.

Existing HHR gaming machines generally resemble slot machines with a display that switches between a "horse mode" providing a horse-racing form and a "game mode" with additional lights, sounds, or effects, such as those commonly associated with a slot machine. These existing systems separate the horse racing component from the entertaining presentation of the game such that only one is fully available at a time, which can confuse a player or cause one element of the game to be missed entirely.

Players using existing HHR gaming machines generally must drill down through one layer or the other of the gaming interface to get to desired data or functionalities, which is often slow, complex, and difficult to learn, particularly for novice players. Likewise, existing systems make it difficult for a player to understand how their race predictions relate to the result of the game.

There is further a problem in existing HHR gaming machines of adequately adjusting to the variability inherent in historical horse-racing data. Existing systems generally limit the races or events used in games to uniform conditions, such as field size. For example, suppose a horse race having 10 horses is used. In that case, all of the races used in the gaming machine are restricted to those races having 10 horses, reducing variety and variability in the races and reducing the number of races available. This also increases the processing requirements of the gaming machine due to the need to compare and match races.

Because of the foregoing, there is a need for an improved gaming machine and method that incorporates the advantages of traditional games of skill in gaming machines, to combine the most appealing features of each. A need exists for an improved gaming machine capable of providing a user with rapid and entertaining gameplay while presenting the information necessary for strategic wagering in an easy-to-use and understandable manner.

There is further a need for a gaming machine capable of selecting and implementing historical results in gaming in a uniform way, without increasing the gaming machine's processing requirements.

SUMMARY

The embodiments disclosed herein are directed to providing an improved gaming machine that addresses the problems above and incorporates the advantages of traditional games of skill, such as horse racing, and the entertaining features of traditional gaming machines in a single improved gaming machine. The embodiments may be employed to facilitate wagering on any historical outcome contest, past event, and/or combination of events.

According to a first aspect of the disclosed embodiments, a computing device comprises a display screen, a processor and an input device. The computing device can display on the display screen a gaming interface presenting an entertaining display and a summary window comprising a limited view of variables related to participants in multiple events, for example, historical horse-racing events.

The computing device may be configured to conduct wagering on past events for a player, the process of conducting a wager including the processor accessing a database to automatically retrieve data about one or more events that occurred in the past and which included multiple participants. The retrieved data may include both a final ranking of the participants in the events and listings of pertinent features of the participants in the events.

In contrast to existing systems that necessarily consider the final ranking of all participants in a historical event for determining the result of a wager and are limited to only those events having the same number of participants, the gaming machine according to the current disclosure may be configured to create a plurality of scorecards from a transformed final ranking of the participants in the selected historical events where only some or a limited number of the participants are considered.

For example, the final ranking of a limited number of participants may include only the participants who finish first, second, and third for each event, even where each event includes more than three participants. By considering the final ranking of fewer than the total number of participants, many historical events are available for use and selection by the gaming machine, even though the selected events may have differing numbers of participants. The variability and variety of scorecards available for gaming are thereby increased, the processing speed of the system is increased, and the computing device's processing load is reduced. A wider variety of available historical horse-racing databases is also made available for use in the gaming machine embodiments of the present disclosure than would otherwise be possible.

The gaming machine may create a plurality of scorecards corresponding to different possible predictions of the final rankings, which are tied to reward levels or reward pools of a pari-mutuel betting system. To define a scorecard, the gaming machine may assign a binary value to the places of the transformed final ranking of the participants of the selected events, such that the reward levels are tied to predicting both correct or positive and incorrect or negative final rankings of the participants in the historical events.

The binary use of both positive and negatives in the scorecards allows for more variety in possible wagers and increased entertainment for a player. Rather than necessarily conditioning a reward to the player's prediction of the final ranking matching the modified final rankings of the events, scorecards considering both negative and positive selections according to embodiments of the present disclosure can provide a player with a variety of different challenges in the same game.

For instance, a reward may be tied to predicting the results of two events where the user must select the first, second, and third finishers correctly in the first event and incorrectly select the first, second, and third finishers in the second event. Given these two events and the corresponding reward, the gaming machine may create a binary scorecard assigning a (1) for a positive or correct selection and a (0) for a negative or incorrect selection such that the scorecard reads (111000) for the two events.

Variations in the scorecard with different combinations of positive and negative selections within the selected events may be tied to different reward pools within the pari-mutuel betting system, which may be controlled by a totalizer, allowing a player to pursue different predictions based on the fluctuations of the different pools and minimizing the impact of cheating. In existing gaming systems, if a player can identify a winner of an event, such as through prior knowledge or by cheating, the player is virtually guaranteed a high payout because these systems consider only correct or positive selections for determining a payout. By considering both positives and negatives in the scorecards as in embodiments of the current disclosure, a player that can identify a winner of an event must still match all of his remaining predictions with the scorecards to earn a payout, and the difficulty of cheating is thereby increased.

A player may conduct a wager by controlling the input device to accept a wager, including a wager value and a prediction of the final ranking, by selecting the final ranking of fewer than the total number of participants in the events presented. In some embodiments, the player may control the input device to automatically select a prediction of the final ranking, corresponding to an automatic selection that is randomized or based on a weighted probability such as handicapping from a ranking, i.e., race odds.

The input device communicates the player's wager to the processor of the gaming machine, and the gaming machine compares the prediction of the final ranking to the plurality of scorecards. If the prediction of the final ranking input by the player matches a scorecard within the plurality of scorecards, the gaming machine communicates the matching scorecard to the totalizer of the pari-mutuel system to determine the reward associated with the matching scorecard. The processor creates an entertaining display corresponding to the final result of the player's wager based on whether and which scorecard the player's prediction matches and the size of the reward pool associated with the scorecard and subsequently displayed for the player.

An entertaining display provides an improved user experience for the player using entertaining lights, sounds, and animations configured to the final result of the player's wager. According to the present disclosure, entertaining displays may be presented in the display screen of the gaming machine and may further include mechanical components. A mechanical reel may be provided in the gaming machine having static displays configured to rotate at different rates in one embodiment. The processor of the gaming machine may be configured to control the rotation of the mechanical reel to align the resulting display of the reel with the final result of the player's wager.

In some embodiments, an entertaining display may include a separate component, such as a separate display screen or mechanical wheel separate from the gaming interface. A separate display screen may be provided as a video topper for displaying the award won by the player in a region of the gaming machine that is visible from surrounding areas, such as above the gaming interface, and may illustrate the final result of the player's wager entertainingly.

In another embodiment, a mechanical wheel is provided with areas corresponding to a plurality of possible player's wager results. The mechanical wheel may be configured to rotate during the player's wager and be controlled by the gaming machine's processor to align the resulting display of the wheel with the final result of the player's wager. The separate component of the entertaining display may be fixed on the gaming machine or configured to turn and present the entertaining display in a rotating manner.

A variety of information on features of the historical participants may be presented in the gaming interface to facilitate a player's predictions of the final ranking for the selected historical events. This information allows a player to employ a strategic element to their choice and can be presented on-demand in an easy to understand format according to the current disclosure. When the wager is completed, the interface may present the participants' final ranking and/or an indication of which of the players predictions were correct or incorrect.

The interface may similarly be used to present an entertaining display related to the result of the player's wager and the associated reward, if any, to increase a player's enjoyment and engagement with the gaming machine. Players desire a balance between the information presented and the entertaining display provided in a gaming machine, but skilled persons have not ascertained how to achieve this balance as conventional gaming machines require that a user switch between different interfaces.

Embodiments of the present disclosure advantageously provide an interface comprising an entertaining display and a summary window that are presented together in the display. The resulting interface according to embodiments of the disclosure may provide a dedicated space for each of the entertaining display and the summary window, with each being scaled to fit the size of the display screen. The summary window may present a limited view of variables and features related to the participants in the selected historical events.

One aspect of the disclosure provides a snapshot view of the features of each event, in which the snapshot view brings together in the summary window a limited list of commonly accessed features or information of events that progress during the course of the game. For instance, the summary window may present a snapshot of the player's predictions that have been made or remain to be made. When a player scrolls onto or selects the snapshot for an event within the summary window using the input device, the summary window may expand to launch the participants' performance profile in the event.

The processor of the gaming machine may be configured to transform the listing of features obtained from the database into the performance profile for each participant, and the player may further expand the performance profile into the listings of the features obtained from the database by scrolling onto or selecting a participant in the event to launch said listing of features of that participant, or may collapse the performance profiles or the listings into an unlaunched state by scrolling away from or deselecting the listing or the snapshot. The player may thereby be exposed to varying and custom levels of listings based on the participants' features to inform a wager decision according to an individual player's desire for analyzing said features.

While the entertaining display changes depending on the player's wager's result, the summary window can remain dedicated to illustrating the selected events. The illustration of the selected events may proceed from the creation of the performance profiles of the participants by the processor to the creation of an animation of the final ranking of the participants in the selected events, and then to a final result identifying the accuracy of each prediction of the player's wager which can similarly launch a listing of the final rankings of all of the participants in the event when selected.

The summary window of exemplary embodiments of the present disclosure advantageously provides a player with the desired level of familiarity with the participants of the selected historical events. The participants' performance profiles are built on the underlying listing of features and can present a player with a snapshot of the participants in the event. By providing the performance profiles and the listings of features in an unlaunched state associated with the summary window, players can determine the level of familiarity they wish to develop with each event prior to making their predictions and accordingly, a skill level they wish to apply. Because the summary window remains directed to the selected events throughout the game, players can always review their predictions and accuracy relative to the actual final rankings.

The exemplary embodiments of the system and method for gaming enable a less complex, more easily controlled, and more entertaining experience for players by generating an interface that provides both an entertaining display and a summary window that displays limited features relating to the selected events, the events further being selectable to launch a performance profile of participants in the event and the performance profiles being selectable to launch a listing of underlying features. The problems of inconsistent event data provided by a database and a lack of variety in available wagers are further addressed by creating a transformed final ranking of the participants in the selected events including less than the total number of participants, the transformed final ranking forming the basis of a scorecard including positive and negative selections.

These and other disclosure features will become better understood by reference to the following description, appended claims, and accompanying drawings.

Figure 1:
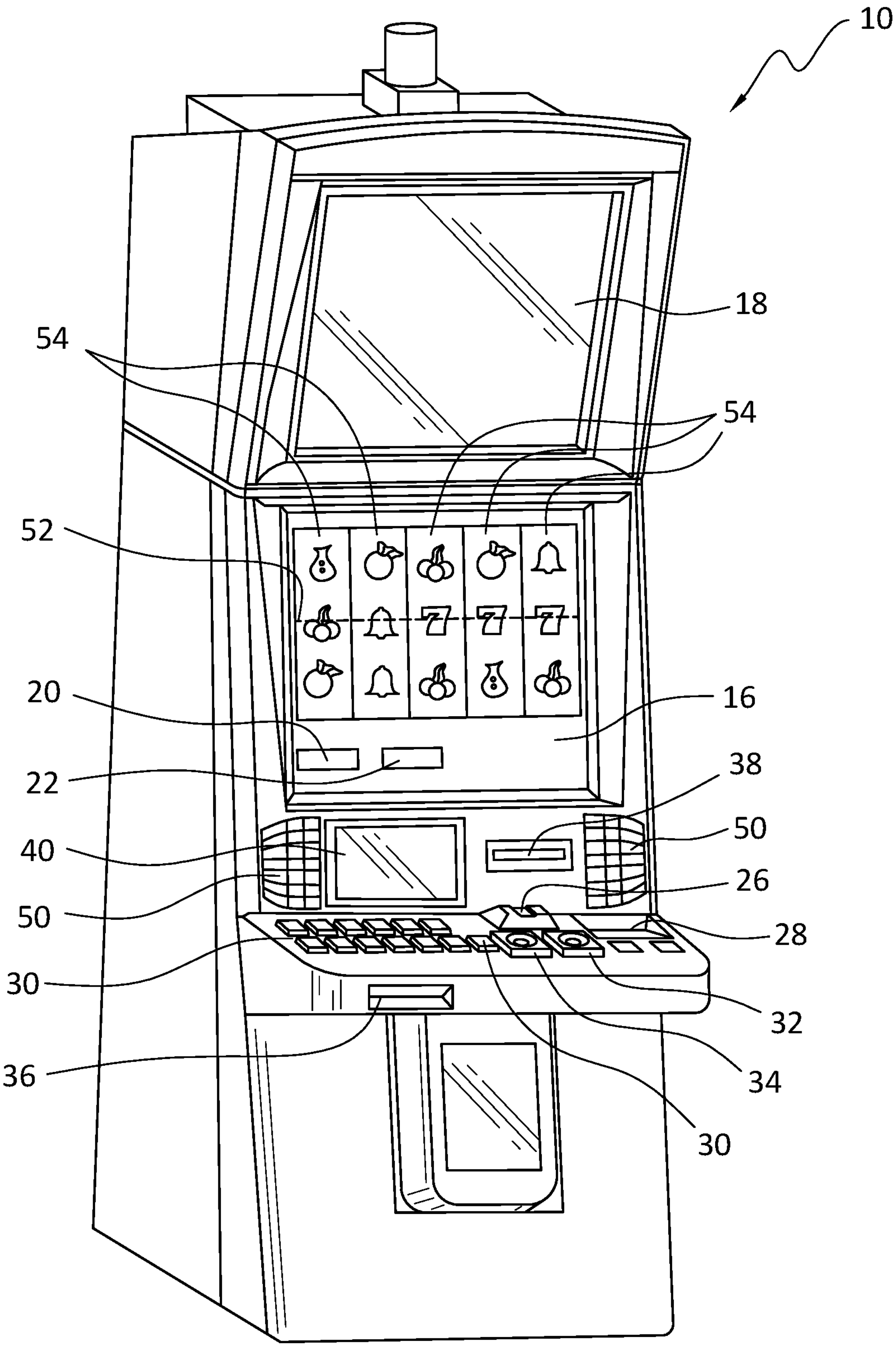
FIG. 1 is a perspective view of a gaming machine according to an embodiment of the present disclosure.

The figures are not necessarily drawn to scale, but instead are drawn to provide a better understanding of the components and are not intended to be limiting in scope, but to provide exemplary illustrations. The figures illustrate exemplary configurations of a system and method for gaming, and in no way limit the structures, configurations, or methods of the system and method for gaming according to the present disclosure.

DETAILED DESCRIPTION OF VARIOUS EMBODIMENTS

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings described below. The dimensions, angles, and curvatures represented in the figures introduced above are understood as exemplary and are not necessarily shown in proportion. It should be understood, however, there is no intention to limit the disclosure to the specific embodiments disclosed, but on the contrary, the intention covers all modifications, alternative constructions, combinations, and equivalents falling within the spirit and scope of the disclosure.

The flowchart illustrations and block diagrams in the flow diagrams illustrate the architecture, functionality, and operation of possible implementations of systems, methods, and computer program products according to various present disclosure embodiments. In this regard, each block in the flowchart illustrations or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart illustrations and/or block diagram block or blocks.

The disclosed embodiments relate to systems and methods for gaming that overcome the problems of inconsistent data in historical gaming machines and provide an improved experience for players. The disclosure outlines some example improvements and practical applications provided by the disclosed embodiments. However, it will be appreciated that these are just examples only and that the embodiments are not limited to only these improvements.

The embodiments may be implemented to overcome many of the technical difficulties and computational expenses associated with gaming, including obtaining and transforming data of one or more historical events, including multiple participants, including features of the multiple participants. The embodiments may provide a combined order of specified rules that render the data of the events and/or the features of the multiple participants into a specific format used to create transformed final rankings and performance profiles in an objective, quantitative way that overcomes the limitations of current methods for conducting wagers on past events, especially across multiple events with varying numbers of participants. By providing the system and method for gaming according to the embodiments, the defining rules and procedures for transforming the final rankings of events may be universally applied to multiple events, thereby providing improved variety and variability in event data.

The disclosed embodiments operate to improve how a gaming machine comprising a computing device operates and/or functions. For instance, the disclosed embodiments can increase the variety and variability of gaming events by following the disclosed principles. Furthermore, the processing speed and operational efficiency of the gaming machine can be improved by transforming the final rankings of the events to reduce the number of places considered, i.e., first, second and third-place finishers, because the device will perform far less (or perhaps none at all) post-processing corrections and compensations for variations in event data. Consequently, the disclosed embodiments operate to improve the computing efficiency and resource utilization of a gaming machine and related computing architecture. As an additional example, by initially generating the transformed final ranking and the participants' performance profile, the disclosed embodiments will also improve the presentation of the events to a player.

The disclosed embodiments may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device before delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment.

The computerized instructions for controlling any games are executed by at least one central server, central controller, or remote host in one embodiment. In such a "thin client" embodiment, the central server remotely controls any games (or other suitable interfaces), and the gaming machine is utilized to display such games (or suitable interfaces) and receive one or more inputs or commands from a player. In another embodiment, the computerized instructions for controlling any games are communicated from the central server, central controller, or remote host to a gaming machine's local processor and memory devices. In such a "thick client" embodiment, the gaming machine's local processor executes the communicated computerized instructions to control any games (or other suitable interfaces) provided to a player.

Referring to FIG. 1, one embodiment of a gaming machine 10, according to an embodiment of the present disclosure, has a support structure, housing, or cabinet that supports a plurality of displays, inputs, controls, and other features of a conventional gaming machine. It is configured so that a player can operate it while standing or sitting. The gaming machine 10 can be positioned on a base or stand or configured as a pub-style tabletop game (not shown), which a player can operate preferably while sitting. It should be appreciated that the gaming machine 10 may have varying cabinet and display configurations.

Figure 2A:
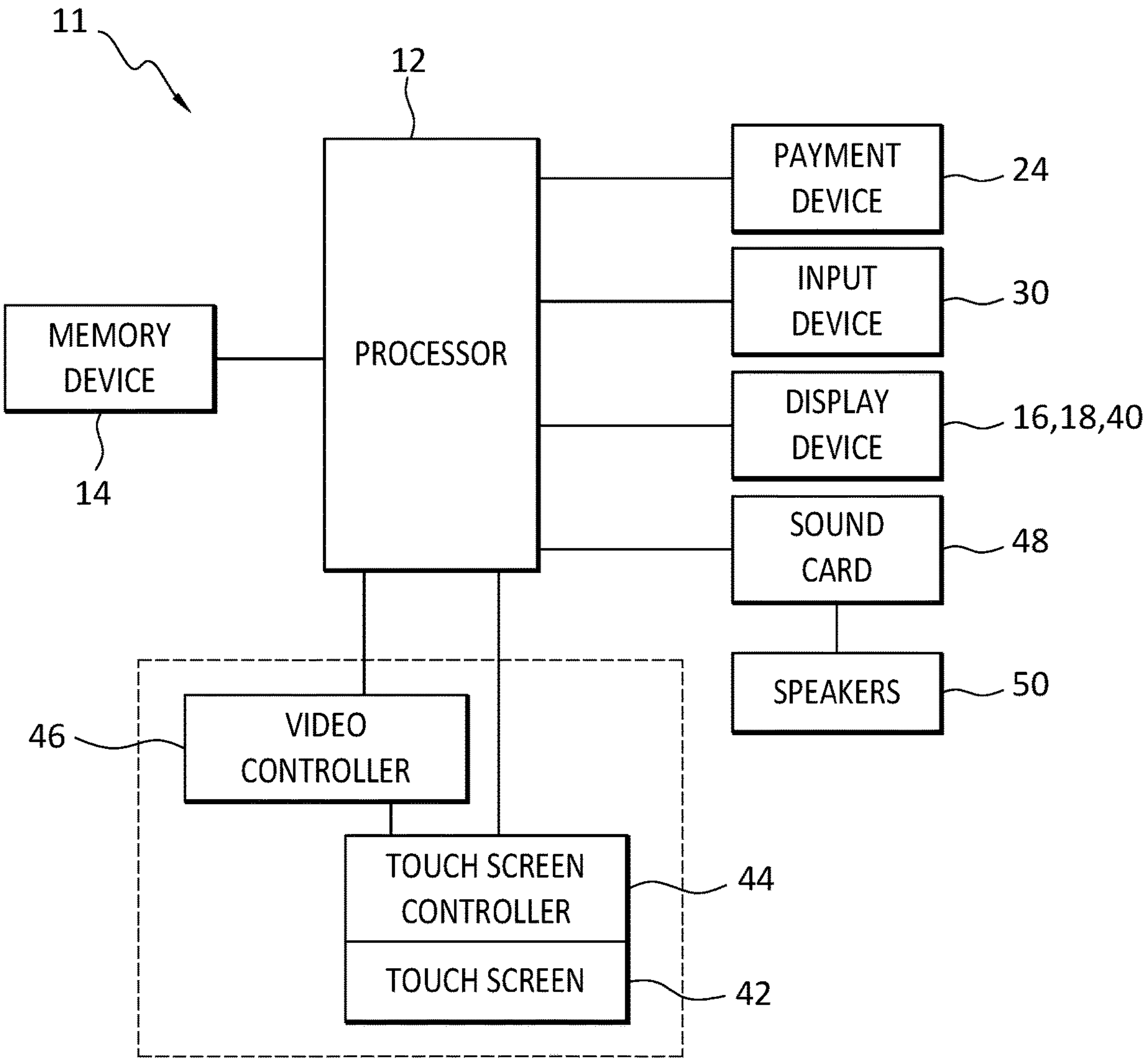
FIG. 2A is a diagrammatic view of an electronic system of a gaming machine according to an embodiment of the disclosure.

In one embodiment, as illustrated in FIG. 2A, an electronic system for facilitating gaming by a player according to the present disclosure is generally shown at 11. The electronic system 11 may be a separate gaming machine or used with the gaming machine 10 of FIG. 1. The electronic system 11 includes at least one processor 12, such as a microprocessor, a microcontroller-based platform, a suitable integrated circuit or one or more application-specific integrated circuits (ASIC's). The processor 12 is in communication with or operable to access or to exchange signals with at least one data storage or memory device 14.

In one embodiment, the processor 12 and the memory device 14 reside within the cabinet of the gaming machine 10. The memory device 14 stores program code and instructions, executable by the processor 12, to control the gaming machine 10. The memory device 14 also stores other data such as image data, event data, player input data, random or pseudo-random number generators, pay-table data or information, and applicable game rules related to the play of the casino game. In one embodiment, the memory device 14 includes random access memory (RAM), which can include non-volatile RAM (NVRAM), magnetic RAM (MRAM), ferroelectric RAM (FeRAM), and other forms as commonly understood in the gaming industry. In one embodiment, the memory device 14 includes read-only memory (ROM). In one embodiment, the memory device 14 includes flash memory and/or EEPROM (electrically erasable programmable read only memory). It should be appreciated that, any other suitable magnetic, optical, and/or semiconductor memory may operate in conjunction with the electronic system 11.

In one embodiment, part or all of the program code and/or operating data described above can be stored in a detachable or removable memory device 14, including, but not limited to, a suitable cartridge, disk, CD ROM, DVD, or USB memory device. In other embodiments, part or all of the program code and/or operating data described above can be downloaded to the memory device 14 through a suitable network.

In one embodiment, an operator or a player can use such a removable memory device in a desktop computer, a laptop computer, a hand-held device, such as a personal digital assistant (PDA), a portable computing or mobile device, or another computerized platform to implement embodiments of the present disclosure. In one embodiment, the electronic system 11 is operable over a wireless network, such as part of a wireless gaming machine. In one such embodiment, the electronic system 11 may be a hand-held device, a mobile device, or any other suitable wireless device that enables a player to play any suitable game at a variety of different locations.

In various embodiments in which the electronic system 11 is a hand-held device, a mobile device, or any other suitable wireless device, at least one memory device 14 and at least one processor 12 which control the game or other operations of the hand-held device, mobile device, or other suitable wireless devices may be located: (a) at the hand-held device, mobile device or other suitable wireless devices; (b) at a central server or central controller; or (c) any suitable combination of the central server or central controller and the hand-held device, mobile device or other suitable wireless devices. It should be appreciated that a gaming device or gaming machine as disclosed herein may be a device that has obtained approval from a regulatory gaming commission or a device that has not obtained approval from a regulatory gaming commission. It should be appreciated that the processor 12 and memory device 14 may be collectively referred to herein as a "computer," "computing device," or "controller."

In one embodiment, as illustrated in FIG. 2A, the electronic system 11 includes one or more display devices 16, 18, 40 controlled by the processor 12. The display devices 16, 18, 40 are preferably connected to or mounted on the cabinet of the gaming machine 10. The embodiment shown in FIG. 1 includes a central display device 16 which displays a primary or base game and an upper display device 18. The central display device 16 may also display any suitable secondary game associated with the primary or base game and information relating to the primary or secondary game. The upper display device 18 may display the primary game, any suitable secondary game associated or not associated with the primary game, and/or information relating to the primary or secondary game. These display devices 16, 18 may also serve as digital glass operable to advertise games or other gaming establishment aspects.

As seen in FIG. 1, in one embodiment, the gaming machine 10 includes a credit display 20 which displays a player's current number of credits, cash, account balance, or the equivalent. The gaming machine 10 may include a bet display 22 which displays a player's amount wagered. The gaming machine 10 may include a player tracking display 40 that displays information regarding a player's play status, including past wins, number of past wagers, etc. It should be appreciated that one or more of these display devices 16, 18, 20, 22, 40 communicate with the processor 12.

In another embodiment, at least one display device may be a mobile display device, such as a PDA or tablet PC, that enables play of at least a portion of the primary or secondary game at a location remote from the gaming machine 10 or electronic system 11.

The display devices 16, 18, 40 may include, without limitation, a monitor, a television display, a plasma display, a liquid crystal display (LCD) a display based on light-emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display devices 16, 18, 40 include a touch-screen with an associated touch-screen controller. The display devices 16, 18, 40 may be of any suitable size and configuration, such as a square, a rectangle or an elongated rectangle.

The display devices 16, 18, 40 of the gaming machine 10 are configured to display at least one and preferably a plurality of games or other suitable images, symbols and indicia such as any visual representation or exhibition of the movement of objects such as mechanical, virtual, or video reels and wheels, etc., and the like.

In one embodiment, the symbols, images and indicia displayed on or of the display device may be in mechanical form. The display devices 16, 18, 40 may include any electromechanical device, such as one or more mechanical objects. An example of an exemplary electromechanical device according to embodiments of the disclosure may include one or more rotatable wheels or reels configured to display at least one or a plurality of games or other suitable images, symbols or indicia.

As illustrated in FIG. 2A, the electronic system 11 may include at least one payment device 24 in communication with the processor 12. The payment device 24 may be a payment acceptor including a note, ticket or bill acceptor 28 (FIG. 1) wherein the player inserts paper money, a ticket, or voucher, and/or a coin slot 26 (FIG. 1) where the player inserts money, coins, or tokens. In other embodiments, other payment devices 24 such as readers or validators for credit cards, debit cards or credit slips may accept payment. A player may insert an identification card into a card reader 24 of the gaming machine 10.

The identification card may be a smart card with a programmed microchip, a coded magnetic strip or coded rewritable magnetic strip. The programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming machine 10. In one embodiment, money may be transferred by a player to a gaming machine 10 through electronic funds transfer. It should be appreciated that, when a player funds the gaming machine 10, the processor 12 determines the amount of funds entered and displays the corresponding amount on the credit or other suitable display as described previously.

As seen in FIGS. 1 and 2A, in one embodiment the gaming machine 10 and electronic system 11 includes at least one input device 30 in communication with the processor 12. The at least one input device 30 can include any suitable device that enables the player to produce an input signal received by the processor 12. In one embodiment, after appropriate funding of the gaming machine 10, the input device 30 is a game-activation device, such as a play button 32 or a pull arm (not shown) which is used by the player to start any primary or base game or sequence of events in the gaming machine 10. The play button 32 can be any suitable play activator such as a bet-one button, a max-bet button, or a repeat-the-bet button. In one embodiment, upon appropriate funding, the gaming machine 10 begins the game play automatically. In another embodiment, upon the player engaging one of the play buttons 32, the gaming machine 10 automatically activates game play.

In one embodiment, one input device is a bet one button. The player places a bet by pushing the bet-one button 32. The player can increase the bet by one credit each time the player pushes the bet-one button 32. When the player pushes the bet-one button 32, the number of credits shown in the credit display 20 preferably decreases by one, and the number of credits shown in the bet display preferably increases by one. In another embodiment, one input device 30 is a bet-max button (not shown), enabling the player to bet the maximum wager permitted for a game of the gaming machine 10.

In one embodiment, one input device is a cash-out button 34. The player may push the cash out button 34 and cash out to receive a cash payment or other suitable form of payment corresponding to the remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system).

In another embodiment, when the player cashes out, the player receives the coins or tokens in a coin payout tray. In one embodiment, the gaming machine 10 includes at least one card reader 38 in communication with the processor 12. In this embodiment, a player is issued a player identification card with an encoded player identification number that uniquely identifies the player. When the player inserts their playing tracking card into the card reader 38 to begin a gaming session, the card reader 38 reads the player identification number off the player tracking card to identify the player. It should be appreciated that any suitable payout mechanism, such as funding to the player's electronically recordable identification card or smart card, may be implemented by the gaming machine 10.

In one embodiment, as mentioned above and as seen in FIG. 2A, one input device is a touch-screen 42 coupled with a touch-screen controller 44 or some other touch-sensitive display overlay to allow player interaction with the images on the touch screen 42. The touch-screen 42 and the touch-screen controller 44 are connected to a video controller 46. A player can make decisions and input signals into the gaming machine 10 or the electronic system 11 by touching the touch-screen 42 at the appropriate locations. One such input device is a conventional touch-screen button panel.

The electronic system 11 may further include a plurality of communication ports for enabling communication of the processor with external peripherals, such as external video sources, expansion buses, game or other displays, a SCSI port, or a keypad.

In one embodiment, as seen in FIG. 2A, the electronic system 11 includes a sound generating device controlled by one or more sounds cards 48 which function in conjunction with the processor 12. In one embodiment, the sound-generating device includes at least one and preferably a plurality of speakers 50 or other sound-generating hardware and/or software for generating sounds. The sound-generating device may, for example, play music for the primary and/or secondary game or play music for other modes of the gaming machine 10, such as an attract mode.

In one embodiment, the gaming machine 10 provides dynamic sounds coupled with attractive multimedia images displayed on one or more of the display devices 16, 18, 40 to provide an audio-visual representation or to display full-motion video with sound otherwise to attract players to the gaming machine 10. During idle periods, the gaming machine 10 may display a sequence of audio and/or visual attraction messages to attract potential players to the gaming machine 10. The videos may also be customized to provide any appropriate information.

In one embodiment, the gaming machine 10 may include a sensor, such as a camera, in communication with the processor 12 (and possibly controlled by the processor 12), that is selectively positioned to acquire an image of a player actively using the gaming machine 10 and/or the surrounding area of the gaming machine 10. In one embodiment, the camera may be configured to acquire still or moving selectively (e.g., video) images and may be configured to acquire the images in an analog, digital, or other suitable formats. The display devices 16, 18, 40 may be configured to display the image acquired by the camera and display the visual features of the game in a split-screen or picture-in-picture fashion. For example, the camera may acquire an image of the player and the processor may incorporate that image into the primary and/or secondary game as a game image, symbol or indicia.

The gaming machine 10 can incorporate any suitable wagering game as the primary or base game. The gaming machine 10 may include some or all of the features of conventional gaming machines or devices.

In one embodiment, as illustrated in FIG. 1, a base or primary game may include an entertaining display with one or more paylines 52. The paylines 52 may be horizontal, vertical, circular, diagonal, angled or any combination thereof. In this embodiment, the gaming machine 10 includes at least one and preferably a plurality of reels 54, such as three to five reels 54, in either electromechanical form with mechanical rotating reels or video form with simulated reels and movement thereof.

In one embodiment, an electromechanical slot machine includes a plurality of adjacent, rotatable reels, which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming machine 10.

In another embodiment, one or more of the reels 54 are independent reels or unisymbol reels. In this embodiment, each independent or unisymbol reel generates and displays one symbol to the player. The gaming machine 10 may control the reels 54 of the entertaining display to stop spinning in an arrangement corresponding to the player's wager.

In one embodiment, in addition to winning credits or other awards in a base or primary game, the gaming machine 10 may also allow players to win credits in a bonus or secondary game or in a bonus or secondary round simultaneously or subsequently. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game is similar to the base or primary game.

Figure 2B:
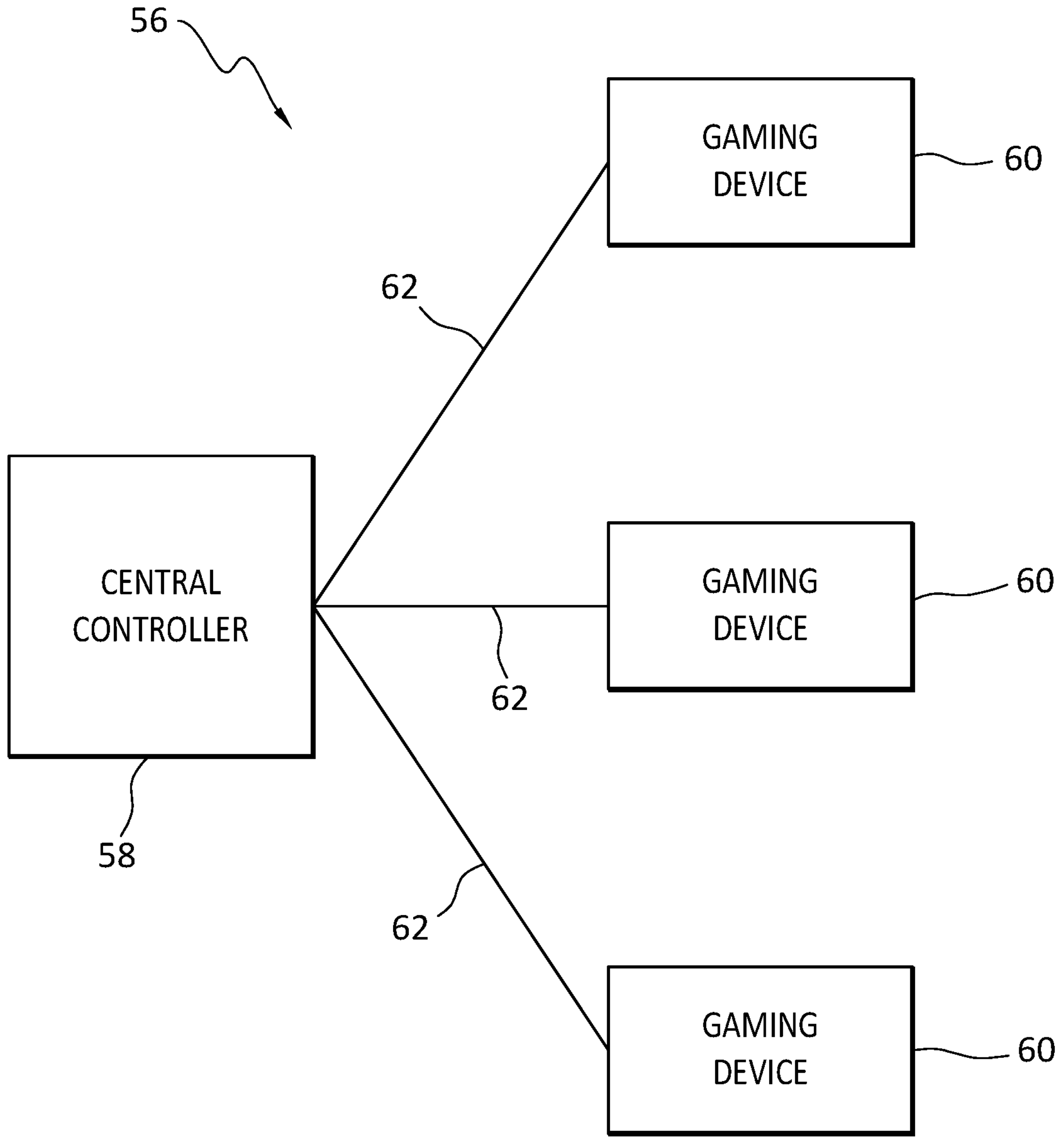
FIG. 2B is a diagrammatic view of a gaming system according to an embodiment of the disclosure.

In one embodiment, as illustrated in FIG. 2B, a gaming system according to the present disclosure is generally shown at 56. The gaming system 56 includes at least one central controller 58 and one or more gaming controllers or devices 60 in communication with each other and/or the at least one central controller 58 through a data network or remote communication link 62. In this embodiment, the central server, central controller, central computer, or remote host is any suitable server or computing device which includes at least one processor and at least one memory or storage device. In different such embodiments, the central server is a progressive controller or a processor of one of the gaming machines in the gaming system.

In these embodiments, each gaming machine's processor is designed to transmit and receive events, messages, commands, or any other suitable data or signal between the individual gaming machine and the central server. The gaming machine processor is operable to execute such communicated events, messages, or commands in conjunction with the gaming machine's operation. Moreover, the central server's processor is designed to transmit and receive events, messages, commands, or any other suitable data or signal between the central server and each of the individual gaming machines. The central server processor is operable to execute such communicated events, messages, or commands in conjunction with the operation of the central server. It should be appreciated that one or more gaming machine processors may perform one, more or each of the functions of the central controller, central server or remote host as disclosed herein. It should be further appreciated that one, more or each of the functions of one or more gaming machine processors as disclosed herein may be performed by the central controller, central server or remote host.

In one embodiment, a plurality of the gaming machines 60 can be connected together through a data network. In one embodiment, the data network is a local area network (LAN), in which one or more of the gaming machines 60 are substantially proximate to each other and an on-site central server or controller as in, for example, a gaming establishment or a portion of a gaming establishment. In another embodiment, the data network is a wide area network (WAN) in which one or more of the gaming machines are in communication with at least one off-site central server or controller. In this embodiment, the plurality of gaming machines 60 may be located in a different part of the gaming establishment or within a different gaming establishment than the off-site central server or controller. Thus, the WAN may include an off-site central server or controller and an off-site gaming machine located within gaming establishments in the same geographic area, such as a city or state. The WAN gaming system may be substantially identical to the LAN gaming system described above, although the number of gaming machines in each system may vary.

In another embodiment, the data network 62 is an internet or intranet. In this embodiment, the operation of the gaming machine 60 may be viewed at the gaming machine 60 using at least one internet browser implemented thereon. In this embodiment, operation of the gaming machine 60 and accumulation of credits may be accomplished with only a connection to the central server or controller 58 (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and the number and speed of internet connections in recent years increases players' opportunities to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, embodiments may be employed in a server-based gaming system. In one such embodiment, as described above, one or more gaming machines 60 are in communication with a central server or controller 58. The central server or controller 58 may be any suitable server or computing device which includes at least one processor and a memory or storage device. In alternative embodiments, the central server is a progressive controller or another gaming machine of the gaming system. In one embodiment, the memory device of the central server stores different game programs and instructions, executable by a gaming machine processor, to control the gaming machine. Each executable game program represents a different game or type of game that may be played on one or more gaming machines in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming machine) or vice versa.

In this embodiment, each gaming machine 60 at least includes one or more display devices and/or one or more input devices for interaction with a player. A local processor, such as the above-described gaming machine processor or a processor of a local server, is operable with the display device(s) and/or the input device(s) of one or more of the gaming machines.

In operation, the central controller 58 is operable to communicate one or more of the stored game programs to at least one local processor. In different embodiments, the stored game programs are communicated or delivered by embedding the communicated game program in a device or a component (e.g., a microchip to be inserted in a gaming machine), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s). When a game program is communicated to a local processor, the local processor changes the game or type of game played at the gaming machine.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made periodically, and/or made or initiated on an as needed basis.

The methodologies described herein may be implemented by various means depending upon applications according to particular examples. For example, such methodologies may be implemented in hardware, firmware, software, or combinations thereof. In a hardware implementation, for example, the controller or processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the description included herein are presented in terms of algorithms or symbolic representations of operations on binary digital signals stored within a memory of a specific apparatus or special purpose computing device or platform. In the context of this particular specification, a specific apparatus or the like includes a general-purpose computer once it is programmed to perform particular operations according to instructions from program software. Algorithmic descriptions or symbolic representations are examples of techniques used by those of ordinary skill in the signal processing or related arts to convey the substance of their work to others skilled in the art. An algorithm is generally considered a self-consistent sequence of operations or similar signal processing, leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. However, it should be appreciated that all of these or similar terms are to be associated with appropriate physical quantities and are merely convenient labels. Unless specifically stated otherwise, as apparent from the discussion herein, it is appreciated that throughout this specification, discussions utilizing terms such as "processing," "computing," "calculating," "determining," or the like refer to actions or processes of a specific apparatus, such as a special purpose computer or a similar special-purpose electronic computing device. In the context of this description, therefore, a special purpose computer or a similar special-purpose electronic computing device is capable of manipulating or transforming signals, typically represented as physical electronic or magnetic quantities within memories, registers, or other information storage devices, transmission devices, or display devices of the special purpose computer or similar special-purpose electronic computing device.

For clarity in discussing the various functions of the system, multiple computers and/or servers are discussed as performing different functions. These different computers (or servers) may, however, be implemented in multiple different ways such as modules within a single computer, as nodes of a computer system, etc. The functions performed by the system (or nodes or modules) may be centralized or distributed in any suitable manner across the system and its components, regardless of specific hardware location. Furthermore, specific components of the system may be referenced using functional terminology in their names. The function terminology is used solely for naming convention purposes and to distinguish one element from another in the following discussion. Unless otherwise specified, the name of an element conveys no specific functionality to the element or component. It should be appreciated that, in selected embodiments, the software, hardware, and associated components of the system may be programmed and configured to implement one or more embodiments described herein. It should also be appreciated that the various aspects of the system may be exemplified as software, modules, nodes, etc. of a computer or server.

Embodiments of the current disclosure may include a gaming machine or system configured to facilitate wagering on multiple historical events concurrently. The central controller or server 58 of the system may include databases, terminals, and computing devices to manage one or more common betting pools in a pari-mutuel wagering environment. The central controller 58 may include a totalizer for accepting and processing wagers of a plurality of players, making pool allocations, calculating odds and prices of wagers, calculating the commission for the operator, and distributing winnings. Rewards may be distributed to players based on scorecards including positive and negative picks associated with a wagering pool of the totalizer. The central controller 58 may maintain separate math models and separate pari-mutuel wagering pools for different denominations and wager levels offered by each model.

Figure 3:
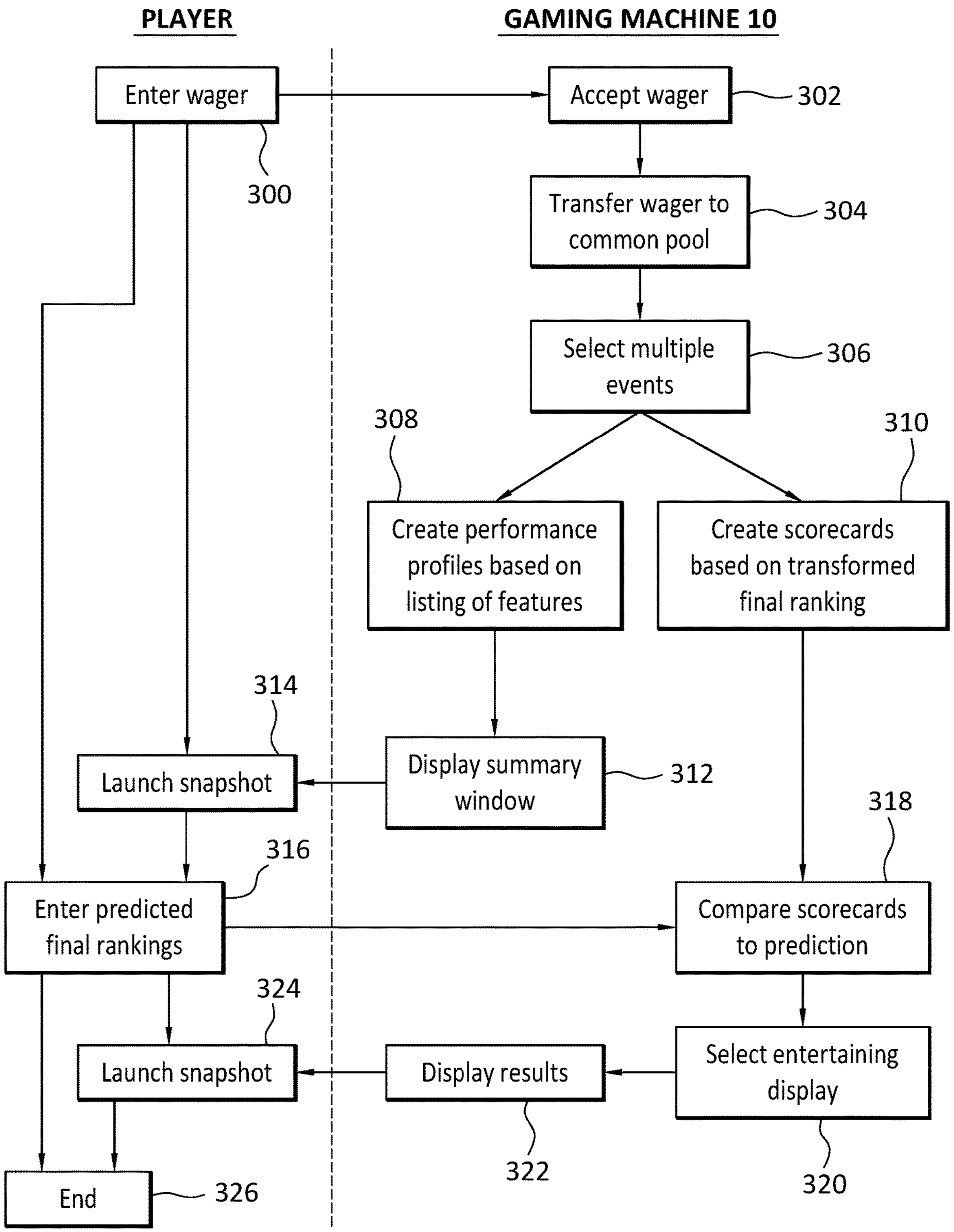
FIG. 3 is a flowchart of one embodiment of operating a gaming machine according to the present disclosure.

According to an embodiment of the current disclosure, the gaming machine 10 is configured to facilitate wagering on past events by a player as illustrated in the flowchart illustration of FIG. 3.

The player initiates the game on the gaming machine 10 and may place a wager 300 by any suitable method, such as described previously by transferring money to the gaming machine 10. At least one or a plurality of input devices 30 may be used to facilitate the wager and the gaming machine 10 accepts the wager 302.

The wager is transferred 304 to a common pool associated with the wager level of the wager provided by the player. The step of transferring the wager 304 to a common pool may include transferring the wager to a central controller 58. The central controller 58 may include a totalizer for allocating or managing wagers among common pools under a pari-mutuel gaming system.

The gaming machine 10 controls the processor to communicate with an event database for selecting multiple events 306 and the associated final rankings of the participants and listings of features of the participants. The event database may be located in a remote server, in the memory of the gaming machine 10 or another suitable location. According to an embodiment of the current disclosure, the processor of the gaming machine may be configured to select multiple events randomly or may select multiple events based on a predetermined data filter. The multiple events may include at least two events, at least three events, at least four events, at least five events, at least six events or may preferably include eight events. The aforementioned numbers of events are merely exemplary and any number of events may be included.

According to the current disclosure, a predetermined data filter may be arranged for selecting multiple events according to the specific regulations of the gaming jurisdiction wherein the gaming machine 10 is located. These regulations typically prescribe limitations on the data which can be used, such as on the race data available for use in HHR gaming machines. As such, any HHR data included in such gaming machines must be constructed and filtered such that the selection of each event complies with these types of regulatory requirements.

Starting from raw HHR data, or other event data, a series of filters may be applied in a predetermined sequence to efficiently create sets of event data for a given jurisdiction or regulatory framework. Examples of filters which may be applied, but are not required, may include: excluding events having venues in certain geographic locations, excluding events by type of event or participant (e.g. event rules, participant age, participant gender, participant breed, etc.), excluding events having fewer than a minimum number of participants, excluding events having more than a maximum number of participants, excluding events having one or more disqualified or scratched participants, excluding events with one or more participant that did not complete the event, excluding events where multiple participants were assigned/awarded the same final ranking, excluding events having entries with non-integer program numbers, excluding events for which program numbers do not run consecutively from 1-N (where N is the number of runners in the race), excluding events for which final rankings do not run consecutively from 1-N.

It will be understood that the list of the above filters is merely exemplary, and the filters may be rearranged, added to, included or excluded, and otherwise modified within the spirit and scope of the disclosure.

The predetermined data filter may be established based on rules, laws or other requirements of the jurisdiction in which the gaming machine 10 is intended to be located, or the gaming machine 10 may include a location module for detecting the location of the gaming machine 10. In an embodiment wherein the gaming machine 10 includes a location module, such as determining the location of the gaming machine 10 using GPS information, an IP address, etc., the gaming machine 10 may select a data filter automatically based on the location of the gaming machine 10. Additional location-based filtering is also contemplated, such as filtering events by the frequency of use of the event in the geographic location or establishment to prevent over use or recognition of the event, etc.

The data about the selected events may include a final ranking for the multiple participants of each event, the final ranking for the respective participants in each event determined by the finishing position in the field and ranking the participants concerning other participants who competed in the same event. Other ranking systems may be used, such as rankings based on both subjective or objective performance metrics assigned by the rules of a sport, a judge, or a panel of judges.

At 310 the processor of the gaming machine 10 may transform the final rankings of the selected events to limit the number of participants (e.g. horses of a historical horse-racing event) that are considered and define a scorecard. The transformed final ranking of fewer than the total number of participants may include only the participants that finish first, second and third for each event, where each event includes more than three participants.

By considering the final ranking of less than the total number of participants a greater number of events are available for gaming relative to existing gaming systems where only events having the same number of participants are permitted. Embodiments of the current disclosure may use events with differing numbers of participants. The variability and variety of scorecards available for gaming are increased, the processing speed of the gaming machine 10 is increased, and the processing load of the gaming machine 10 is reduced.

To define a scorecard according to the current disclosure's embodiments, the processor may consider both negative and positive predictions. A reward may be tied to predicting the results of two events where the user must select the first, second and third finishers correctly in the first event and incorrectly select the first, second and third finishers in the second event. Given these two events and the corresponding reward, the gaming machine may create a binary scorecard assigning a (1) for a positive or correct selection and a (0) for a negative or incorrect selection such that the scorecard reads (111000) for the two events.

Additional scorecards may include the correct selection of the first finisher and the incorrect selection of the second and third finishers for each race (100100), the correct selection of the second finisher and the incorrect selection of the first and third finishers for each race (010010), and the correct selection of the third finisher and the incorrect selection of the first and third second finishers for each race (001001). Additional combinations may be employed covering any number of combinations, e.g. (101010), (100010), (001110), etc., such as would be understood from the present disclosure by one skilled in the art. The use of scorecards with different combinations of positive and negative selections for comparison to the selection of the user increases the difficulty of cheating and the variability of wagers available, as the user must pick both the correct finishers and incorrect finishers.

Variations in the scorecard with different combinations of positive and negative selections within the selected events may be tied to different reward pools within the pari-mutuel betting system controlled by the totalizer and/or the central controller 58.

At 308 the processor 12 may create performance profiles for each participant in the selected events based on the participants' listings of features. The listings of features of the participants may include physical characteristics of a participant, historical performances of a participant in different distances, different environmental conditions, and other conditions. In some embodiments, the processor may create performance profiles for each participant based on all of the events provided in the database by searching the database for all previous events and computing a single-value score that incorporates all such past performance data.

According to some embodiments, the participant may be a racehorse, and the listings of features may include characteristics of the racehorse, a jockey riding the horse, and a trainer affiliated with the racehorse and/or jockey such as is generally provided to players at a racetrack in a daily racing form or horse racing form. Within these embodiments, it may be possible for the processor to search a historical horse-race database for all previous race results for each horse, jockey, and trainer in the database, given the date for a specific race; and compute a single-value score which incorporates all such past performance data.

In one example, the processor may, for each combination of [Horse | Jockey | Trainer] [H | J | T] in a historical horse race (HHR) database, find all race-entries of which that [H | J | T] was a member and sort such race-entries by date-of-race (ascending). For each race-entry identified, the processor may iterate through such race-entries in ascending date-sorted order and accumulate a past-performance record with each iteration. Thus, on iteration N, the accumulated past-performance record of the [H | J | T] under consideration is based on the N−1 prior races/iterations. For a given race-date, race performance from races that occurred on the same date may be excluded as it may not be possible to determine which same-day race occurred first.

For each race-entry identified and relevant data accumulated in the past-performance record, the processor may sum up prior starts, prior $1^{st}$ place finishes, prior $2^{nd}$ place finishes, prior $3^{rd}$ place finishes, and prior in-the-money (ITM) finishes (generally defined as finishing in either $1^{st}$ place, $2^{nd}$ place, or $3^{rd}$ place). From these sums, the processor computes a base score of [H | J | T], defined as 100*(Number of prior ITM finishes)/(Number of prior starts), with a minimum score of 0.0 and a maximum possible score of 100.0.

To account for [H | J | T] where only a small amount of prior race performance data is available, the processor may apply a scaling factor to the base score. For example, where a smaller number of starts is available, the base score may be multiplied by a scaling factor of less than 1. Multiple scaling factors may be employed, such that as the number of starts available decreases, the base score is multiplied by a scaling factor with a corresponding decrease from 1.

Additional Win Factor scaling may be applied to the scaled score to account for the number of prior $1^{st}$ place finishes relative to the number of prior ITM finishes. For example, as the number of prior $1^{st}$ place finishes relative to the number of prior ITM finishes decreases, the base score may be multiplied by a Win Factor of less than 1. Multiple Win Factors may be employed, such that as the number of prior $1^{st}$ place finishes relative to the number of prior ITM finishes decreases, the base score is multiplied by a Win Factor with a corresponding decrease from 1.

The single-value score created by the processor is preferably transformed into a graphical representation such as a bar graph or similar graphic demonstrating the score for the participant, including the horse, jockey and trainer, comprising the performance profile of the participant. It will be understood that the disclosed embodiments of HHR games are merely exemplary and that features of the present disclosure may also extend to other historical games and events, live horse-racing events and other live games, and the like.

Figure 4:
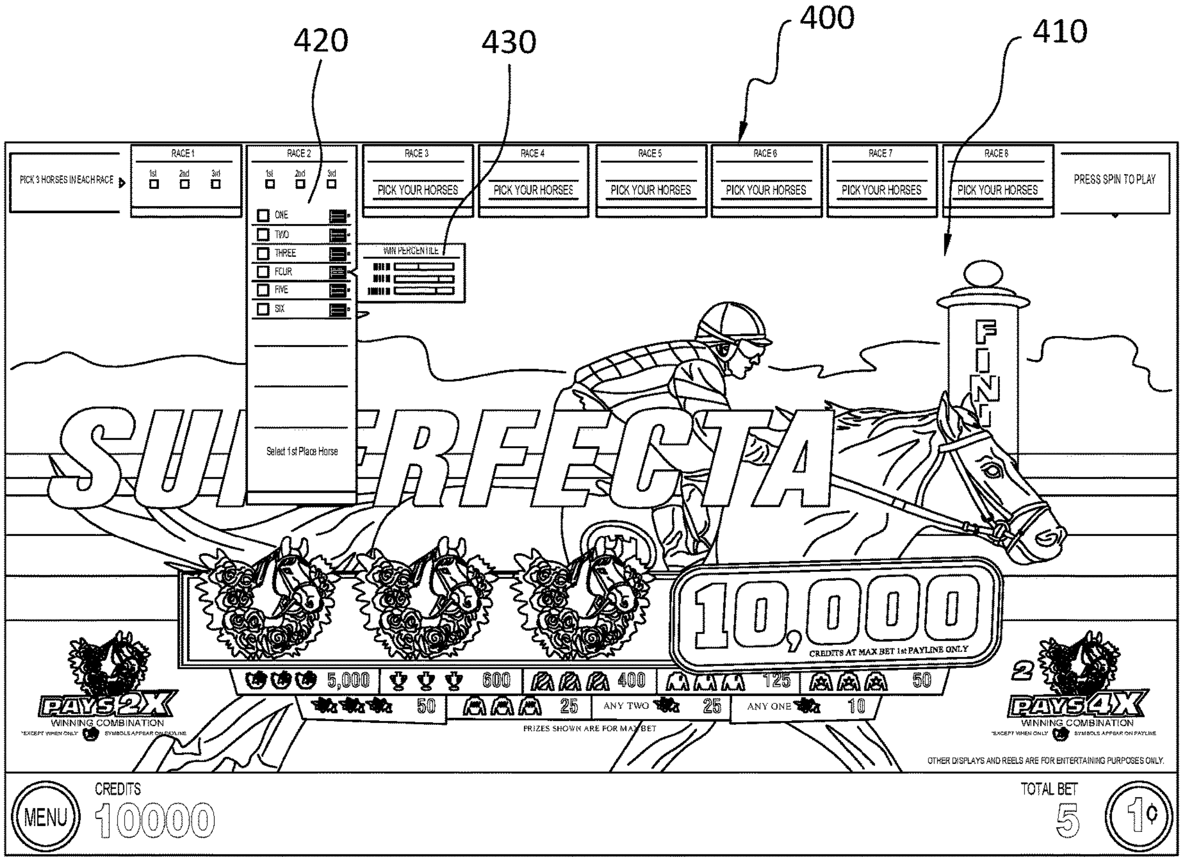
FIG. 4 illustrates a user interface including a summary window and an entertaining display for presenting output and accepting input before completing a wager according to an embodiment of the disclosure.

The performance profiles of the participants created by the processor are tied to a summary window 400 within an interface of the gaming machine 10, as shown in FIG. 4. As illustrated, the interface may include both the summary window 400 and an entertaining display 410, such that each of the summary window 400 and entertaining display 410 are provided with a dedicated space and are scaled to fit therein. This arrangement advantageously allows a player to engage with a particular game or functionality on the gaming machine 10 without precluding the concurrent playing of additional games or use of additional functionalities.

In an initial state of the interface, the summary window 400 may present a limited view of each event. When a player selects or scrolls over an event in the summary window 400, a snapshot 420 is launched 314, wherein the player is provided with the performance profiles of each participant in the event. Selecting or scrolling over an individual participant may launch an additional snapshot 430 showing a more detailed performance profile and/or listing features associated with the participant.

From the summary window 400, a player may create a predicted final ranking 316 based on the desired reward and the associated scorecard. The predictions for each event, or a need for said predictions, are shown in the summary window 400 and may be launched again by selecting or scrolling over the event.

According to the current disclosure, the player can select an auto-select or auto-fill option, wherein the processor automatically creates a predicted final ranking 316 based on a randomized selection, the performance profiles for each participant, or some combination thereof. In contrast to existing systems which restrict the player to only one of manual or automatic handicapping, the auto-select or auto-fill option according to the present disclosure may be used in combination with a manual selection, such that the player creates a partial predicted final ranking before selecting the auto-select or auto-fill option to complete the predicted final ranking 316 automatically.

Although the term 'window' has been used to describe a drop-down summary, the summary does not have to be presented within any kind of frame. Any manner of presenting the common functions offered within the launched snapshot 420 and/or data stored in that snapshot 420 will constitute a 'window' as such or an equivalent.

The predicted rankings may be submitted to the processor compared to the scorecards of the gaming machine 318. In further embodiments, the scorecards may be provided in a paytable wherein the paytable identifies which scorecards are available for comparison to the predicted rankings based on the wager level provided by the player. If there is an available scorecard that is an exact match with the predicted rankings provided by the player, including both positive and negative selections, the final result is communicated to the totalizer or the central controller 58 to determine the reward associated with the scorecard, based on the value of the common pool at the totalizer.

The processor then creates and/or selects an entertaining display 410 corresponding to the final result of the player's wager 320, based on whether a scorecard is found that is an exact match to the predicted rankings, which scorecard was an exact match, and the value won from the common pool. The entertaining display 410 created may break the value won from the common pool into multiple animations or bonus games. Breaking the value won into multiple animations or bonus games can increase the enjoyment and successful feeling of the player and encourage continued gaming.

In some embodiments, the entertaining display 410 may include a separate component (not shown), such as a separate display screen or mechanical wheel separate from the summary window 400. The separate component may be mounted to the gaming machine of a region above the summary window 400 to increase visibility and presents the result of the player's wager in an entertaining manner that is visible to the player and surrounding individuals. The separate components may include a video display or a mechanical wheel provided with areas corresponding to a plurality of possible results of the player's wager. The mechanical wheel may be configured to rotate during the player's wager and be controlled by the processor of the gaming machine to align the resulting display of the wheel with the final result of the player's wager.

Figure 5:
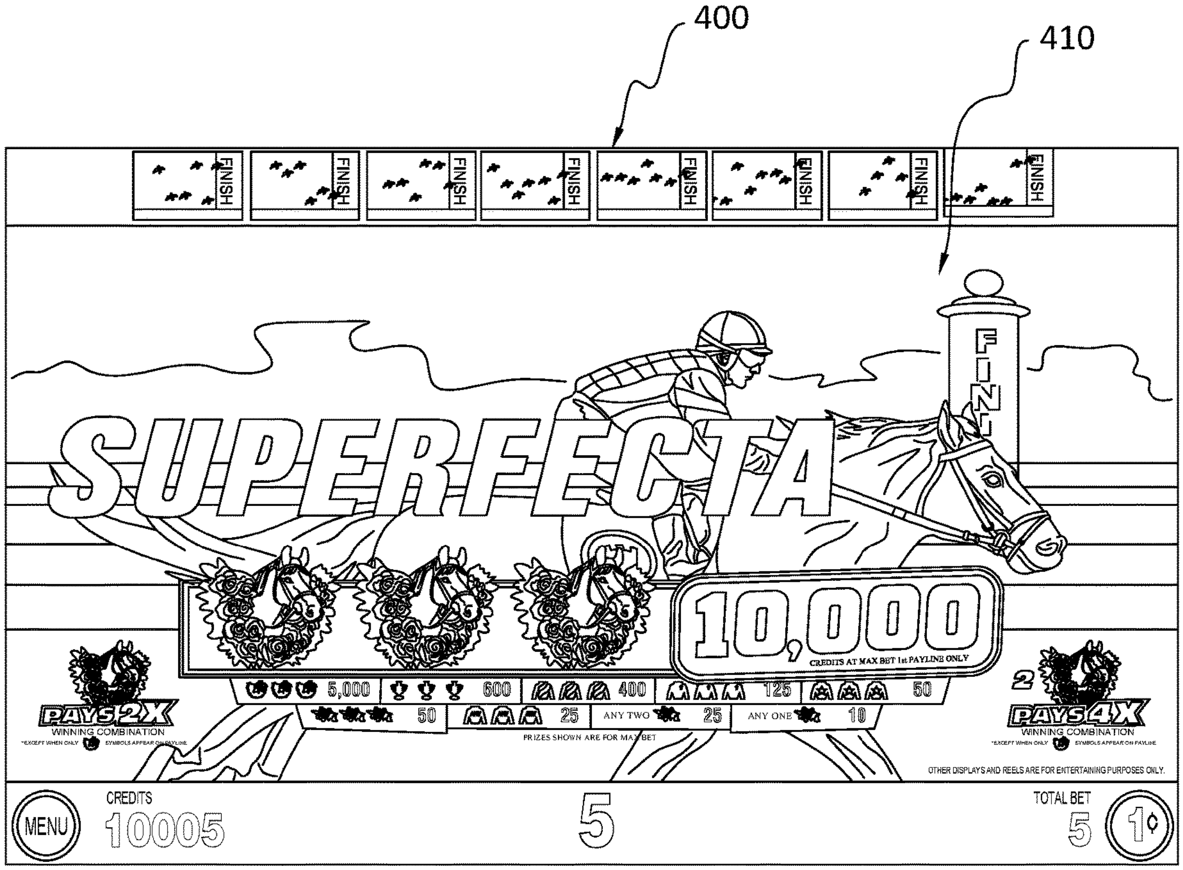
FIG. 5 illustrates a user interface including a summary window and an entertaining display for presenting entertaining content during the processing of a wager.

During the presentation of the entertaining display 410, the summary window 400 can remain dedicated to illustrating the selected events. The illustration of the selected events may proceed from the creation of the performance profiles of the participants by the processor to the creation of an animation of the final ranking of the participants in the selected events as shown in FIG. 5, and then to an illustration of a final result 322 identifying the accuracy of each prediction of the player's wager, while the entertaining display 410 and/or summary window 400 may also illustrate a wager result 322. The illustration of the final result may include a comparison of each prediction of the player's wager relative to the final result in each event without displaying the final rankings of all of the participants in the event, and selecting one of the events can similarly launch a snapshot 620 of the final rankings of all of the participants in the event 324. The animation of the final ranking of the participants may include replay information such as video clips or graphical representations of the results of various events.

Figure 6A:
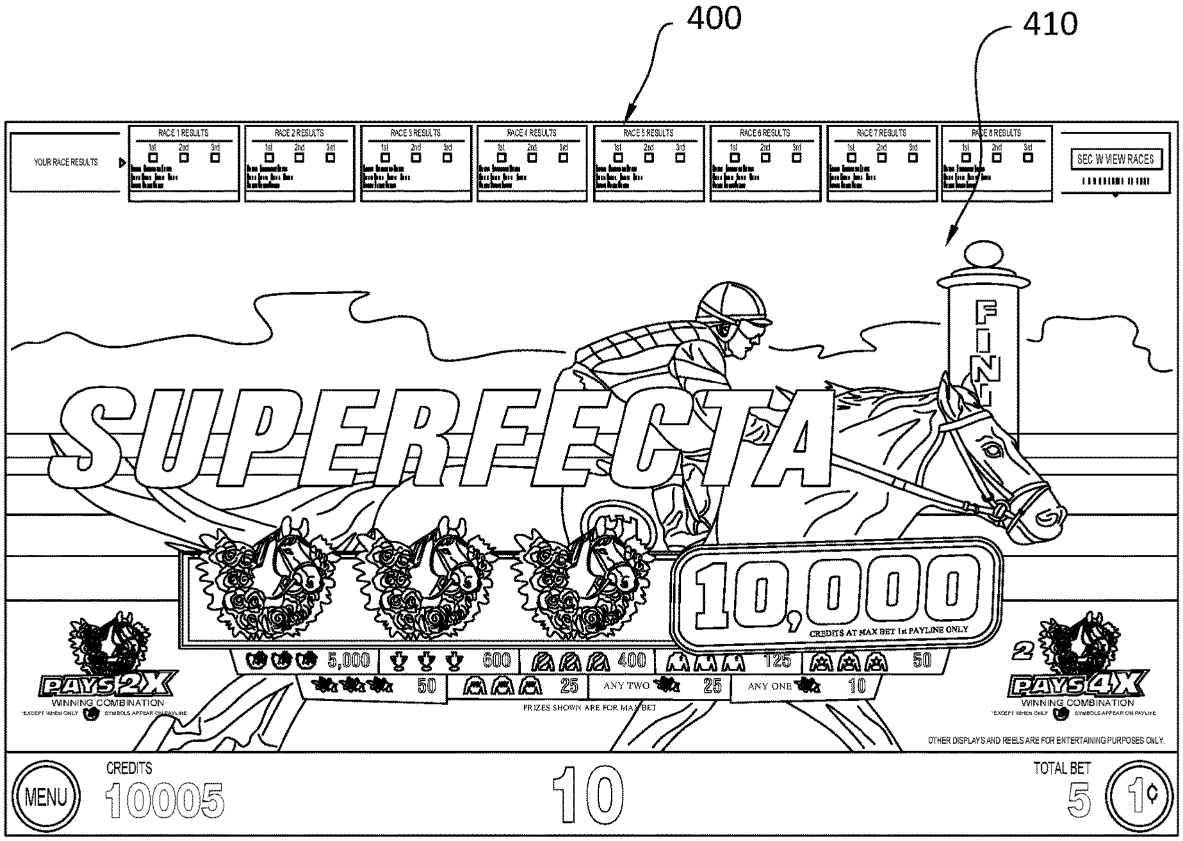
FIG. 6A illustrates a user interface including a summary window and an entertaining display for presenting output and accepting input following completion of a wager according to an embodiment of the disclosure.
Figure 6B:
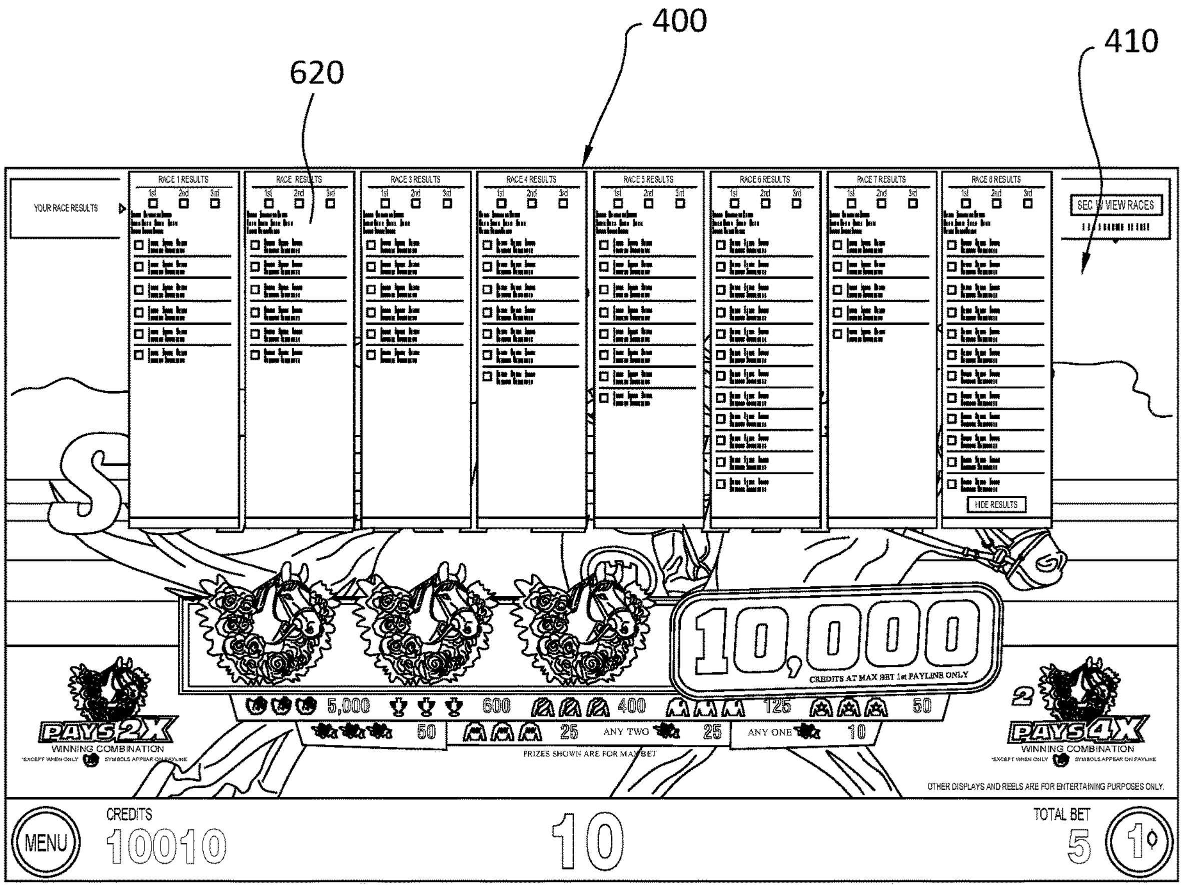
FIG. 6B illustrates a user interface including a summary window, a snapshot, and an entertaining display for presenting output and accepting input following completion of a wager according to an embodiment of the disclosure.

The interface provided after the final result of a wager is illustrated in FIGS. 6A and 6B. The snapshot 620 may be launched after the wager provides a detailed view of the event's results compared to the predicted results submitted by the player. It may also include charts, graphs, statistical data, and the like explaining predicted results and actual final results for the participants in the events themselves.

The wager may end 326 with a payout, beginning another wager 300, another round, a bonus game, and/or by reverting to a menu providing additional options for the player.

The entertaining display may be based on a theme as described previously. The theme may be selected by a player based on preference and/or may be manipulated by the processor in response to a particular final result of a wager. The theme may include accompanying depictions and animated highlights of matching predictions as the participants complete the event. The entertaining display may include matches with graphics, symbols, and other indicia particular to the theme. One example of a theme generated by the processor in an electronic wagering device is illustrated in FIGS. 4-6B. In this example, the entertaining display includes other graphics, colors, symbols, and various indicia to enhance the overall user experience beyond the summary window 400 which facilitates the wager.

According to a preferred embodiment, the entertaining display may include mechanical components including at least one and preferably a plurality of reels 54, such as three to five reels 54, in electromechanical form with mechanical rotating reels. In one embodiment, the entertaining display 410 includes an electromechanical slot machine comprising a plurality of adjacent, rotatable reels 54 which may be combined and operably coupled with an electronic display of any suitable type. Each reel 54 displays a plurality of indicia or symbols, such as bells, hearts, fruits, numbers, letters, bars, or other images which preferably correspond to a theme associated with the gaming machine. The processor may control the electromechanical reels 54 to stop spinning in an arrangement corresponding to the final result of the player's wager.

Tying the function of the electromechanical reels 54 to the wager according to the current disclosure allows the gaming machine 10 to provide the feel of a traditional gaming machine, such as a slot machine, while retaining the strategic appeal and regulatory advantages of a traditional game of skill, such as horse racing.

By providing a gaming machine and method for using the same according to the disclosed embodiments, the problems of existing gaming machines being slow, cumbersome, and confusing to use, and offering insufficient modifications to historical or other data that would enable to selection and use of a wider variety of game-related information are addressed. The gaming machine embodiments provided herein advantageously allow a player to apply the desired level of skill and insight to a gaming process while enjoying an improved gaming-machine interface, thereby increasing a player's enjoyment of the gaming machine generally.

While the invention has been illustrated and described in detail in the drawings and preceding description, the same is to be considered as illustrative and not restrictive, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each publication, patent, or patent application were specifically and individually indicated to be incorporated by reference and outlined in its entirety herein.

The invention claimed is:

1. A gaming machine comprising:

a display device configured to display an output to a user, the output comprising a summary window and an entertaining display;

an input device configured to accept a wager from the user; a memory storage; and a processor coupled to the memory, the input device, and the display device wherein the processor is configured to:

retrieve event data about multiple selected events from an event database, wherein the event data includes data about multiple participants participating in each event of the multiple selected events;

transform the event data of each event of the multiple selected events into a final ranking of the multiple participants in the multiple selected events, the final ranking including fewer than a total number of participants in the event data; and compare a predicted ranking provided by the user in the summary window to said final ranking to determine a reward for the user, wherein comparing the predicted ranking to the final ranking includes comparing a plurality of binary scorecards with the predicted ranking, wherein the plurality of binary scorecards include negative predictions and positive predictions relative to the final ranking.

2. The gaming machine of claim 1, wherein the multiple selected events are horse races and the multiple participants are horses, such that the predicted ranking is a predicted order of finish for the horses in each of the horse races, and where the final ranking is an actual order of finish for fewer than a total number of the horses.

3. The gaming machine of claim 1, wherein the final ranking comprises an actual order of finish of three participants in each of the multiple selected events.

4. The gaming machine of claim 1, wherein the multiple selected events comprise eight events selected from the event database, a number of the multiple participants in the multiple selected events being different between at least two of the multiple selected events.

5. The gaming machine of claim 1, wherein the summary window being configured to display a listing of three participants of the multiple participants in each of the multiple selected events, and additionally configured to launch a performance profile including a limited list of data regarding the three participants in the multiple selected events directly from the summary window.

6. The gaming machine of claim 1, wherein upon comparing the predicted ranking provided by the user in the summary window to said final ranking to determine the reward for the user, the processor automatically initiates an entertaining display corresponding to the reward for the user.

7. The gaming machine of claim 6, wherein initiating the entertaining display comprises rotating an electromechanical reel.

8. The gaming machine of claim 2, wherein the processor is configured to obtain a single-value score for each horse by searching all past events in the event database for past results for each horse and incorporating the past results into the single-value score.

9. The gaming machine of claim 8, wherein the summary window lists icons for the multiple selected events and selecting one of the multiple selected events causes the single-value scores for the multiple participants in the selected one of the multiple selected events to be displayed.

10. The gaming machine of claim 1, further comprising a location device for determining a location of the gaming machine, the processor configured to filter the event data from the event database based on the location of the gaming machine.

11. A method comprising:

controlling an input device to accept a wager amount, wherein the input device is controlled by a processor;

using the processor to automatically retrieve event data about multiple events selected from a database, the multiple selected events having multiple participants in each selected event;

transforming the event data of each selected event into a final ranking of the multiple participants in the multiple selected events, the final ranking including fewer than a total number of the multiple participants in the event data;

controlling the input device to accept a predicted ranking from a user for the multiple participants in the selected events, the predicted ranking including fewer than the total number of the multiple participants in the event data; and comparing the predicted ranking provided by the user in the summary window to said final ranking to determine a reward for the user, wherein comparing the predicted ranking to the final ranking includes comparing a plurality of binary scorecards with the predicted ranking, wherein the plurality of binary scorecards include negative predictions and positive predictions relative to the final ranking.

12. The method of claim 11, wherein a plurality of reels having a plurality of reel stop positions is controlled by the processor, the method further comprising the steps of:

initiating spinning of the plurality of reels;

causing each of the plurality of reels to stop spinning at a respective reel stop position corresponding to the determined reward for the user; and providing a payout to the user.

13. The method of claim 11, wherein an entertaining display is controlled by the processor, the method further comprising the steps of:

initiating a first presentation on the entertaining display corresponding to gameplay;

causing a change from the first presentation on the entertaining display to a second presentation, said second presentation corresponding to the determined reward for the user; and providing a payout to the user.

14. The method of claim 11, wherein the final ranking comprises a first, second and third place ranking.

15. The method of claim 11, wherein after comparing the predicted ranking with the plurality of binary scorecards, a scorecard matching the predicted ranking is communicated to a central controller comprising a totalizer, the totalizer configured for managing a common pool of a pari-mutuel betting system.

16. The method of claim 11, wherein the processor is configured to automatically generate a predicted ranking of the multiple participants in response to an input through the input device.

17. The method of claim 11, wherein the multiple selected events comprise eight events selected from the event database, a number of the participants in the multiple selected events being different between at least two of the selected events.

18. The method of claim 11, wherein the event data from the event database is filtered based on a location of the input device.

19. The method of claim 11, wherein the multiple selected events are horse races and the multiple participants are horses, such that the predicted ranking is a predicted order of finish for the horses in each of the horse races, and where the final ranking is an actual order of finish for fewer than a total number of the horses.

20. The method of claim 11, wherein the final ranking comprises an actual order of finish of all of the multiple participants in the multiple selected events.

21. One or more non-transitory computer-readable media having stored thereon executable instructions that when executed by one or more processors of a gaming system configure the one or more processors to perform the method according to claim 11.

* * * * *